United States Patent
Dent (10) Patent No.: US 8,009,628 B2
(45) Date of Patent: Aug. 30, 2011

(54) PRIVATE MOBILITY MANAGEMENT ENHANCEMENTS

(75) Inventor: Paul Wilkinson Dent, Pittsboro, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1118 days.

(21) Appl. No.: 11/680,150

(22) Filed: Feb. 28, 2007

(65) Prior Publication Data
US 2008/0207260 A1   Aug. 28, 2008

(51) Int. Cl.
*H04W 4/00* (2009.01)

(52) U.S. Cl. ..... 370/331; 370/332; 370/333; 455/432.1; 455/435.1; 455/436; 455/440; 455/456.1

(58) Field of Classification Search ............... 455/12.1, 455/13.1, 13.2, 67.11, 67.12, 67.13, 69, 404.2, 455/422.1, 423, 427, 432.1, 436–444, 452.1, 455/452.2, 453, 456.1, 502, 517, 524, 525, 455/552.1; 370/316, 321, 324, 328, 330–333, 370/345, 347, 352, 401, 458; 709/224, 226–229
See application file for complete search history.

(56) References Cited

U.S. PATENT DOCUMENTS

| | | | |
|---|---|---|---|
| 5,572,221 A * | 11/1996 | Marlevi et al. | 342/452 |
| 5,825,759 A * | 10/1998 | Liu | 370/331 |
| 6,195,555 B1 | 2/2001 | Dent | |
| 6,542,716 B1 | 4/2003 | Dent et al. | |
| 6,560,439 B1 * | 5/2003 | Grayson | 455/12.1 |
| 6,618,757 B1 | 9/2003 | Babbitt et al. | |
| 7,146,418 B2 * | 12/2006 | Bahl | 709/224 |
| 7,184,418 B1 | 2/2007 | Baba et al. | |
| 7,444,149 B2 * | 10/2008 | Prehofer | 455/436 |
| 7,454,217 B2 * | 11/2008 | Edge et al. | 455/502 |
| 7,457,269 B1 * | 11/2008 | Grayson | 370/337 |
| 7,583,635 B2 * | 9/2009 | Kwak et al. | 370/331 |
| 2003/0016655 A1 * | 1/2003 | Gwon | 370/352 |
| 2007/0076696 A1 * | 4/2007 | An et al. | 370/352 |
| 2008/0085707 A1 * | 4/2008 | Fadell | 455/435.3 |

FOREIGN PATENT DOCUMENTS

| | | |
|---|---|---|
| EP | 1585270 A1 | 10/2005 |
| GB | 2438664 A | 12/2007 |
| WO | 2004/066070 A2 | 8/2004 |
| WO | 2007/023177 A1 | 3/2007 |

OTHER PUBLICATIONS

Perkins, Charles E. "Moible IP." IEEE Communications Magazine, vol. 35, Issue 5, May 1997, pp. 84-99.

* cited by examiner

*Primary Examiner* — Anthony Addy
(74) *Attorney, Agent, or Firm* — Coats & Bennett, P.L.L.C.

(57) ABSTRACT

A method and apparatus described herein uses a mobility server to supplement the mobility management operations of a conventional mobile switching circuit (MSC). The mobility server receives mobility messages from a wireless terminal, and updates a location register associated with the MSC responsive to the received mobility messages. According to one exemplary embodiment, the mobility server has a pre-determined network address, such as a phone number, IP address, etc. The wireless terminal sends the mobility messages as user-plane messages to the pre-determined network address over a traffic data channel. In one exemplary embodiment, the mobility messages indicate the imminent loss of usable base station signals at an identified wireless terminal. For this embodiment, the mobility server may identify a satellite beam associated with the wireless terminal's location based on the received mobility messages, and update the location register accordingly.

14 Claims, 7 Drawing Sheets

PRIVATE MOBILITY MANAGEMENT ENHANCEMENTS

TECHNICAL FIELD

The present invention relates generally to wireless communication networks, and more particularly to mobility management within wireless communication networks.

BACKGROUND

As idle wireless terminals move within a wireless network, the network employs mobility management to keep track of the wireless terminal's location. Conventional networks use a Mobile Switching Center (MSC) to execute mobility management operations at the network. For example, a wireless terminal may transmit a registration message to a selected base station, i.e., the base station having the strongest signal at the wireless terminal. The selected base station controller subsequently transmits a signaling-plane message to the MSC so that the MSC may update a location register based on the selected base station. Subsequently, the network uses the paging area associated with the selected base station to send paging signals to the wireless terminal.

When the wireless terminal moves outside the range of one or more base stations in the network, the wireless terminal may not be able to rely on terrestrial communications to send registration messages. To address this problem, a wireless terminal may send a registration message via a satellite system serving the area corresponding to the wireless terminal's current location. Unfortunately, the registration messages required to implement this solution may overwhelm the satellite system.

Another solution requires the wireless terminal to send a "detach" message to the terrestrial network upon determining that loss of terrestrial service is imminent. For example, U.S. Pat. No. 6,542,716, which is incorporated herein by reference, describes a mobility management process where the wireless terminal measures the signal strength of all received signals. Based on the measured signal strength, the wireless terminal predicts the imminent loss of the terrestrial service and sends a detach message via the terrestrial network. The terrestrial network then forwards the detach message to the MSC to update the corresponding location register. In response, the network sends future paging signals to the wireless terminal via a satellite system. Because the detach message is not used in all current wireless standards, and because there is no guarantee that the detach message will be incorporated into future standards, this solution may not be supported by all wireless networks.

Thus, there remains a need for an alternative method for updating the location register that does not rely on transmitting registration or other mobility management control messages via a satellite system, and that is at least partially independent of the requirements of current and future wireless standards.

SUMMARY

A method and apparatus described herein supplements the mobility management operations of a conventional MSC by adding a mobility server. The mobility server comprises a communication interface to receive mobility messages from a wireless terminal, and a message processor to update a location register responsive to the mobility messages. According to one exemplary embodiment, the communication interface may be associated with a pre-determined network address, such as a phone number, IP address, etc. The mobility messages are sent from the wireless terminal to the mobility server as user-plane messages over a traffic data channel. In one exemplary embodiment, the mobility messages indicate the imminent loss of usable base station signals at an identified wireless terminal. For this embodiment, the message processor may identify a satellite beam associated with the wireless terminal's location based on the received mobility messages, and update the location register accordingly.

A wireless terminal according to one embodiment of the present invention includes memory, a prediction processor, and a message processor. The memory stores the network address of the mobility server. The prediction processor predicts future mobility management events associated with the wireless terminal. For example, the prediction processor may evaluate a characteristic of the signals received from one or more base stations, and use the evaluation to predict future mobility management events. In another embodiment, the prediction processor may determine a location of the wireless terminal and predict the future mobility management events based on the determined location. The message processor generates the mobility messages based on the predicted mobility management events, and sends the mobility messages to a mobility server as user-plane messages over a traffic data channel.

DETAILED DESCRIPTION

The following describes the invention in terms of a user-plane, signaling-plane, and control-plane. The term "user-plane" is used herein to identify messages that the wireless terminal transmits to any destination with an address in a Public Communications Network, such as the Internet or the Public Switched Telephone Network (PSTN). In the case of the Internet, user-plane messages may be addressed to an "IP address." In the case of the PSTN, user-plane messages may be addressed to a phone number, such as a toll-free phone number. Cellular standards do not limit the content of user-plane messages.

The term "signaling-plane" is used herein to identify messages that are sent from a wireless terminal via a base station of a wireless communication network and may subsequently, after possible translation into another format or protocol, be conveyed to a Mobile Switching Center (MSC) for action. Cellular standards rigidly define the types, content, and format of signaling-plane messages. As such, signaling-plane messages are not amenable to ad-hoc modification.

The term "control-plane" is used herein to identify messages sent between elements of a wireless communication network or networks, such as messages sent between a Base Station Controller (BSC) and its MSC, or messages sent between the MSC of one network and the MSC of another network. Such messages are more rigidly controlled and standardized than signaling-plane messages. Typical standards used for control-plane messages between two MSCs are IS-41 and Signaling System number 7 (SS7).

Existing wireless communication networks may receive mobility messages from wireless terminals. The network uses the received mobility messages to execute mobility management operations. In existing networks, such mobility messages are sent as one of a number of predetermined signaling-plane messages that are compatible with existing control-planes. However, the control-plane and/or signaling-plane of existing networks may not support enhanced signaling-plane messages associated with enhanced wireless communication networks, where the enhanced signaling-plane messages may, for example, facilitate some new mobility management feature. As a result, the new mobility management features would not be available to any wireless terminal receiving service via an existing, non-enhanced wireless communication network.

The mobility server described herein supplements the conventional mobility management operations associated with existing wireless communication networks. More particularly, the mobility server updates a location register associated with a wireless terminal responsive to mobility messages received from the wireless terminal. The mobility messages are sent to the mobility server as user-plane messages over a traffic data channel. As a result, the mobility server described herein overcomes the rigidity of the existing signaling and control planes by allowing enhanced features to be implemented and managed via the user-plane. This makes the enhanced features available to the wireless terminal even when the wireless terminal is receiving service via a non-enhanced wireless communication network.

Figure 1:
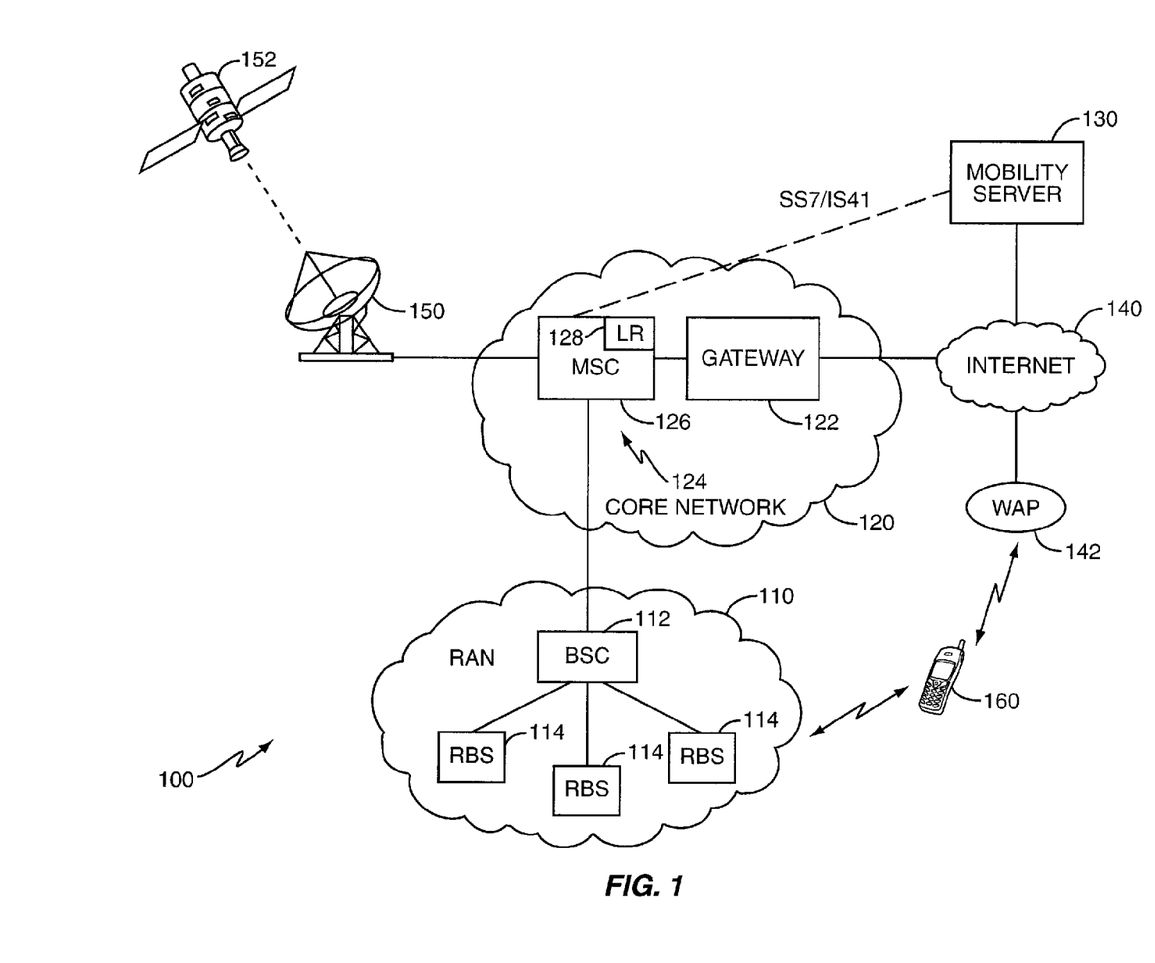
FIG. 1 shows a wireless communication network according to one embodiment of the present invention.

FIG. 1 shows one exemplary wireless communication network 100 according to the present invention. Network 100 may be any packet-switched communication network, including but not limited to a cdma2000 network, a WCDMA network, and a GSM network. Network 100 includes a Radio Access Network (RAN) 110, a core network 120, and a mobility server 130. The network 100 may communicate with one or more wireless terminals 160, which may be native or visiting terminals. Typically, only native terminals 160 utilize the mobility management features provided by the mobility server 130. However, it will be appreciated that visiting terminals 160 may also utilize the mobility management features provided by the mobility server 130.

RAN 110 provides the radio interface between the wireless terminals 160 and the core network 120. An exemplary RAN 110 includes one or more Base Station Controllers (BSCs) 112 and a plurality of Radio Base Stations (RBSs) 114. Wireless terminals 160 communicate with the RBSs 114 via an air interface as defined by any appropriate communication standard. The BSC 112 interfaces the RBSs 114 with the core network 120 to interface the wireless terminals 160 with the core network 120.

Core network 120 provides mobility management, session management, and transport services for data. The core network 120 includes a gateway 122 and a Mobile Switching Circuit/Location Register (MSC/LR) 124. Gateway 122 connects the core network 120 to one or more Public Data Networks (PDNs), such as the Internet 140. The MSC/LR 124 connects the core network 120 to the BSCs 112 in RAN 110 and includes a Mobile Switching Center (MSC) 126 and at least one Location Register (LR) 128. The location register 128 stores the user and/or terminal identification in association with other data, such as location data, for all wireless terminals 160 currently located in and/or native to the network 100. In conventional networks, the MSC 126 updates the location register 128 with registration information transmitted by wireless terminals 160 over the signaling-plane as the wireless terminals 160 move within the network 100. Based on the contents of the location register 128, network 100 selects an appropriate paging area and uses the selected paging area to send paging signals to the wireless terminal 160, or alternatively may route the call to a different network using inter-network control-plane messages. In addition, the MSC 126 connects the core network 120 to one or more Public Switched Telephone Networks (PSTNs) (not shown) to route calls between wireless terminals and landline telephones. The MSC/LR 122 may also connect the core network 120 to a satellite antenna 150 that communicates with a satellite 152 according to any known means. While FIG. 1 shows the satellite system 150, 152 as part of network 100, it will be appreciated that the satellite system 150, 152 may comprise many separate elements which are connected to or otherwise associated with network 100. Further, while the following describes the invention in terms of a satellite system 150, 152, it will be appreciated that the above-described satellite system 150, 152 may comprise any non-terrestrial or alternate communication system that is associated with network 100 and that supplements the service provided to the wireless terminals 160 by RAN 110.

The mobility server 130 supplements conventional mobility management operations by updating the location register 128 responsive to mobility messages received from the wireless terminal 160. The mobility messages are sent by the wireless terminal 160 to the mobility server 130 as user-plane messages over traffic data channels. The received user-plane messages may be translated to control-plane messages by mobility server 130 for subsequent conveyance to and action by the MSC/LR 124. Thus, the mobility server 130 provides an alternate means of mobility management that utilizes available traffic channels to update the location register 128, especially when mobility management methods provided via the existing signaling-plane are inadequate.

Figure 2:
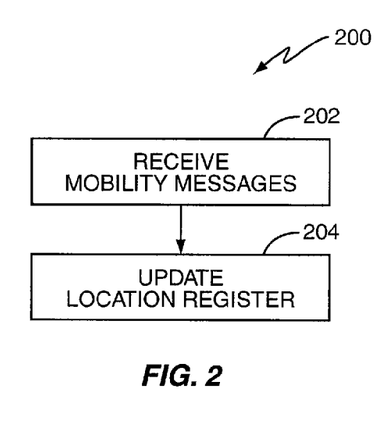
FIG. 2 shows a flow diagram for one exemplary mobility server.

FIG. 2 shows a flow diagram 200 that broadly illustrates the operation of mobility server 130. The mobility server 130 receives user-plane messages from a wireless terminal 160 via any available traffic data channel (block 202). Responsive to the mobility messages, the mobility server 130 may send update messages to the MSC/LR 124 via a control-plane to update the location register 128 (block 204). In the case that mobility server 130 is intimately connected (e.g., hardwired) to the MSC/LR 124, enhancements to its control plane repertoire may be envisaged. Consider the following example. When a wireless terminal 160 moves out of the coverage area of the network 100, the mobility server 130 may send an update message to the location register 128 to indicate that future paging signals should be sent via the satellite 152. Subsequently, network 100 sends future paging messages to the wireless terminal 160 via the satellite 150. The foregoing may also be effected even when the terminal 160 is receiving service via a different, non-enhanced network as the terminal 160 may communicate the imminent loss of service to its mobility server 130 via the user-plane, which all networks support.

Figure 3:
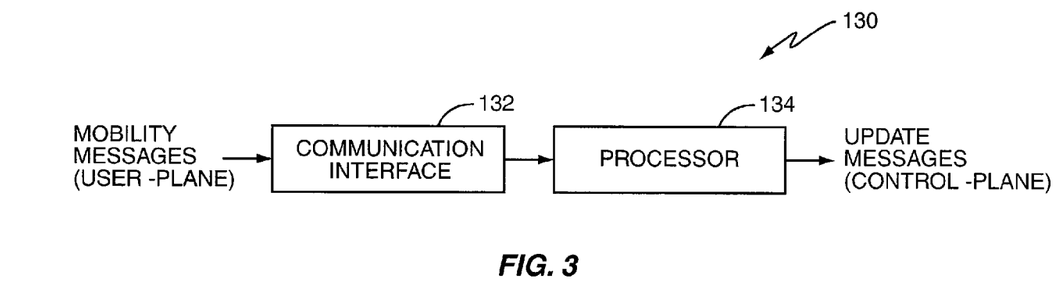
FIG. 3 shows a block diagram of one exemplary mobility server.

FIG. 3 shows one exemplary mobility server 130. Mobility server 130 comprises a communication interface 132 and a processor 134. Communication interface 132 comprises any interface addressed by a predetermined network address and configured to receive mobility messages from the wireless terminal 160. For example, interface 132 may comprise a core network interface addressed by a telephone number. This type of interface enables the mobility server 130 to receive mobility messages in the form of digital data, a Dual-Tone Multi-Frequency (DTMF) sequence, a short text message, etc., using conventional traffic channels associated with a cellular phone call. Alternatively, interface 132 may comprise an Internet interface associated with a predetermined IP address. This type of interface enables the mobility server 130 to receive mobility messages in the form of packet data over Internet 140.

Communication interface 132 provides the received mobility messages to processor 134. Responsive to the mobility messages, the mobility server 130 may send an update message as a control-plane message over a control interface to the MSC/LR 124 to update the location register 128. One exemplary update message may identify the location of the serving RBS 114 as well as the identity of the satellite beam covering the area associated with the serving RBS 114. For this example, the mobility server 130 may include a database of latitude and longitude coordinates of all known RBSs 114. By retrieving the latitude and longitude coordinates of the RBSs 114 in the current paging area of the wireless terminal 160, the mobility server 130 may select the satellite beam associated with the paging area in the control-plane message. It will be appreciated that the satellite beam selection process may be further refined if the received mobility message identifies the serving RBS 114 for the wireless terminal 160.

The mobility server 130 may use any known means to communicate with the MSC/LR 124. As shown in FIG. 1, the mobility server 130 may use Signaling System #7 (SS7), IS-41, etc., to communicate with the MSC/LR 124. Alternatively, mobility server 130 may use the Internet 140 or an intimate (e.g., hardwired) connection to communicate with the MSC/LR 124.

Figure 4:
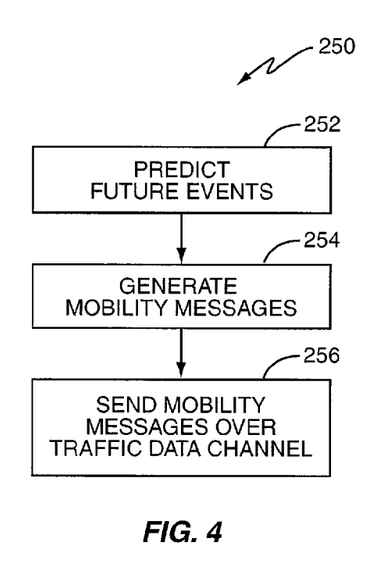
FIG. 4 shows a flow diagram for one exemplary wireless terminal.

FIG. 4 shows a flow diagram that broadly illustrates the operation 250 of an exemplary wireless terminal 160. Wireless terminal 160 predicts future mobility management events as discussed further below (block 252). Based on the prediction, the wireless terminal 160 generates mobility messages (block 254). The wireless terminal 160 sends the mobility messages as user-plane messages to a predetermined network address associated with the mobility server 130 over a traffic data channel (block 256).

Figure 5:
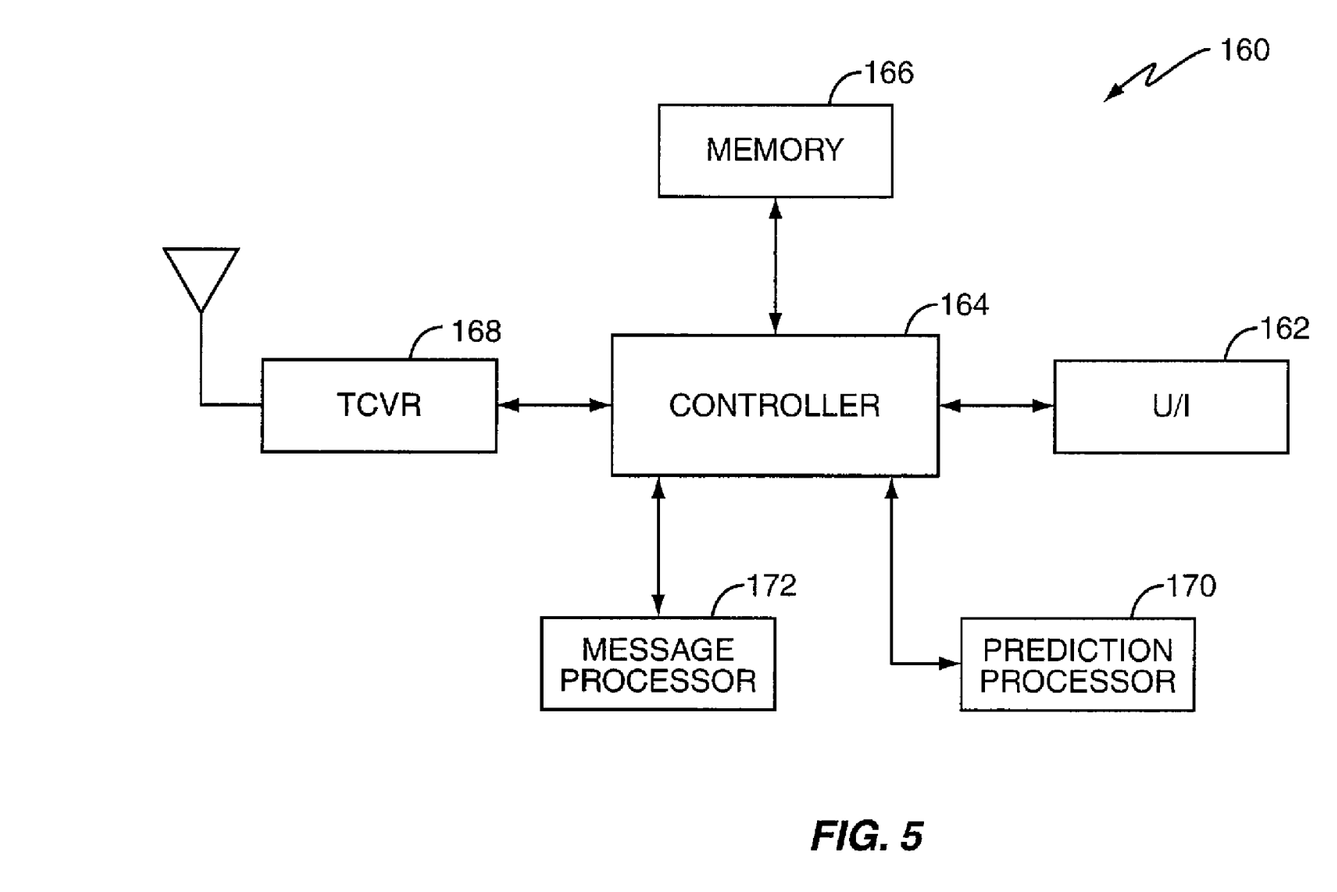
FIG. 5 shows a block diagram of one exemplary wireless terminal.

FIG. 5 shows a block diagram of one exemplary wireless terminal 160 according to the present invention. Wireless terminal 160 includes a user interface 162, controller 164, memory 166, transceiver 168, prediction processor 170, and message processor 172. While FIG. 5 shows controller 164, prediction processor 170, and message processor 172 as separate elements, it will be appreciated that two or more of these elements may be combined into a single processor.

User interface 162 provides a means for the user to interact with and control the wireless terminal 160. Controller 164 controls the operation of wireless terminal 160 according to programs stored in memory 166. In addition, controller 164 interfaces with predication processor 170 and message processor 172. Prediction processor 170 and message processor 172 facilitate the mobility management operations associated with the above-described mobility server 130. More particularly, prediction processor 170 predicts future mobility management events based on signal evaluation and/or location information available to the wireless terminal 160. Message processor 172 generates mobility messages based on the predicted mobility management events that include information regarding changes in the wireless terminal's location and any other type of mobility management information. The contents of exemplary mobility messages may include but are not limited to wireless terminal identification information, a current location of the wireless terminal 160, the identity of the current serving RBS 114, the identity of the current paging area, the timing of a sleep-mode paging slot, and the status of the connection between the wireless terminal 160 and a RAN 110. For example, a mobility message may indicate the imminent loss of usable signals from the RBSs 114 for an identified wireless terminal 160. The mobility message may further identify the current paging area and/or current location coordinates of the wireless terminal 160.

Transceiver 168 is a fully functional radio transceiver that transmits and receives wireless signals, including mobility messages generated by the message processor 172. The transceiver 168 may comprise a long-range transceiver that operates according to any known standard, including the standards known generally as the Global System for Mobile Communications (GSM), TIA/EIA-136, cdmaOne, cdma2000, UMTS, WiMax, and Wideband CDMA. Alternatively or in addition, transceiver 168 may comprise a short-range transceiver that operates according to any known short-range communication standard, such as Bluetooth and WiFi. For example, transceiver 168 may comprise a short-range WiFi transceiver that interfaces with a nearby wireless access point 142 (WAP) in the network 100, as shown in FIG. 1.

When transceiver 168 sends mobility messages to the mobility server 130, the transceiver 168 sends the mobility messages to a predetermined network address stored in memory 166 and associated with the mobility server 130. For example, transceiver 168 may place a call to a predetermined phone number associated with the mobility server 130 to transmit the mobility messages as digital data, a DTMF sequence, a short text message, etc. Alternatively, transceiver 168 may access a predetermined IP address associated with the mobility server 130 via the cellular network or WAP 142 to transmit the mobility messages as packet data. It will be appreciated that the mobility messages may be communicated to the mobility server 130 as user-plane messages via a terrestrial or satellite traffic channel, although it is usually desirable to avoid encumbering satellite capacity with mobility management messages.

Figure 6:
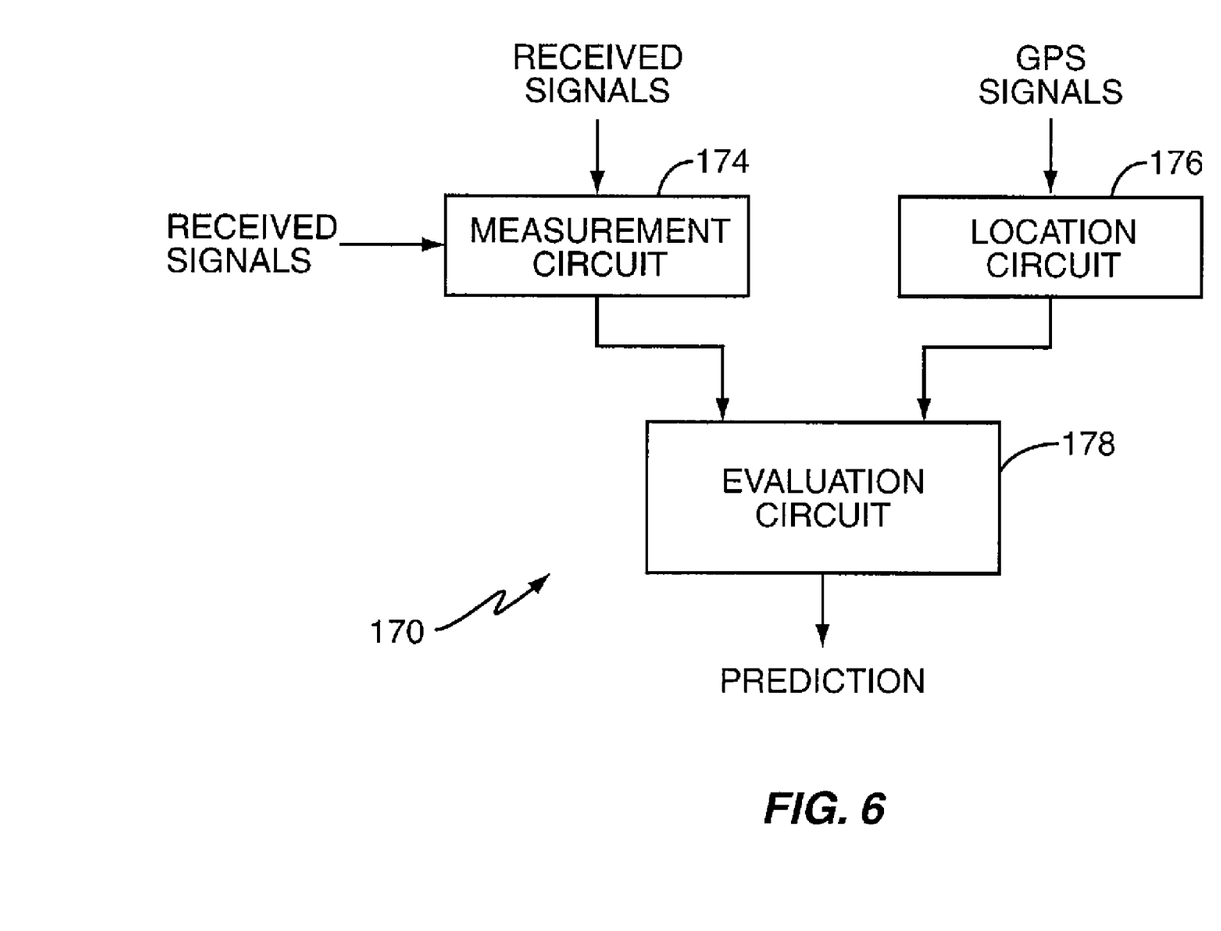
FIG. 6 shows a block diagram of one exemplary prediction processor for the wireless terminal of FIG. 5.

FIG. 6 shows one exemplary prediction processor 170 comprising a measurement circuit 174, location circuit 176, and an evaluation circuit 178. Measurement circuit 174 measures a signal characteristic of signals received from a plurality of RBSs 114, such as the signal strength or the signal quality. For example, the wireless terminal 160 may measure the strength of signals from different RBSs 114 and associated with a predetermined set of frequencies each time the wireless terminal 160 awakens from a sleep mode. Location circuit 178 may determine the location of the wireless terminal 160 according to any known means. For example, the location circuit 176 may use information from a Global Positioning System (GPS) to determine the location of the wireless terminal 160. Alternatively, since the location accuracy required for mobility management purposes is usually very limited, location can be deduced with adequate accuracy from the signals that the wireless terminal 160 is receiving, either from terrestrial or satellite sources, and their respective signal strengths or characteristics. While FIG. 6 shows both a measurement circuit 174 and a location circuit 176, it will be appreciated that the predication processor does not require both circuits.

The measurement circuit 174 and/or location circuit 176 provide the signal characteristics and/or location information to the evaluation circuit 178. Evaluation circuit 178 evaluates the provided data to predict future mobility management events. For example, based on the location information, the evaluation circuit 178 may predict that the wireless terminal 160 will soon be out of the range of any RBSs 114. Alternatively or additionally, the evaluation circuit 178 may use the measured signal strength data to predict a future loss of useable signals from the RBSs 114. For example, evaluation circuit 178 may analyze the signal strengths acquired each time the wireless terminal is awake to determine trends associated with each RBS's signal. In addition, the evaluation circuit 178 may extrapolate the current signal strength data using any known extrapolation method to predict a future mobility management event, such as the imminent loss of usable signals from the RBSs 114.

Figure 7:
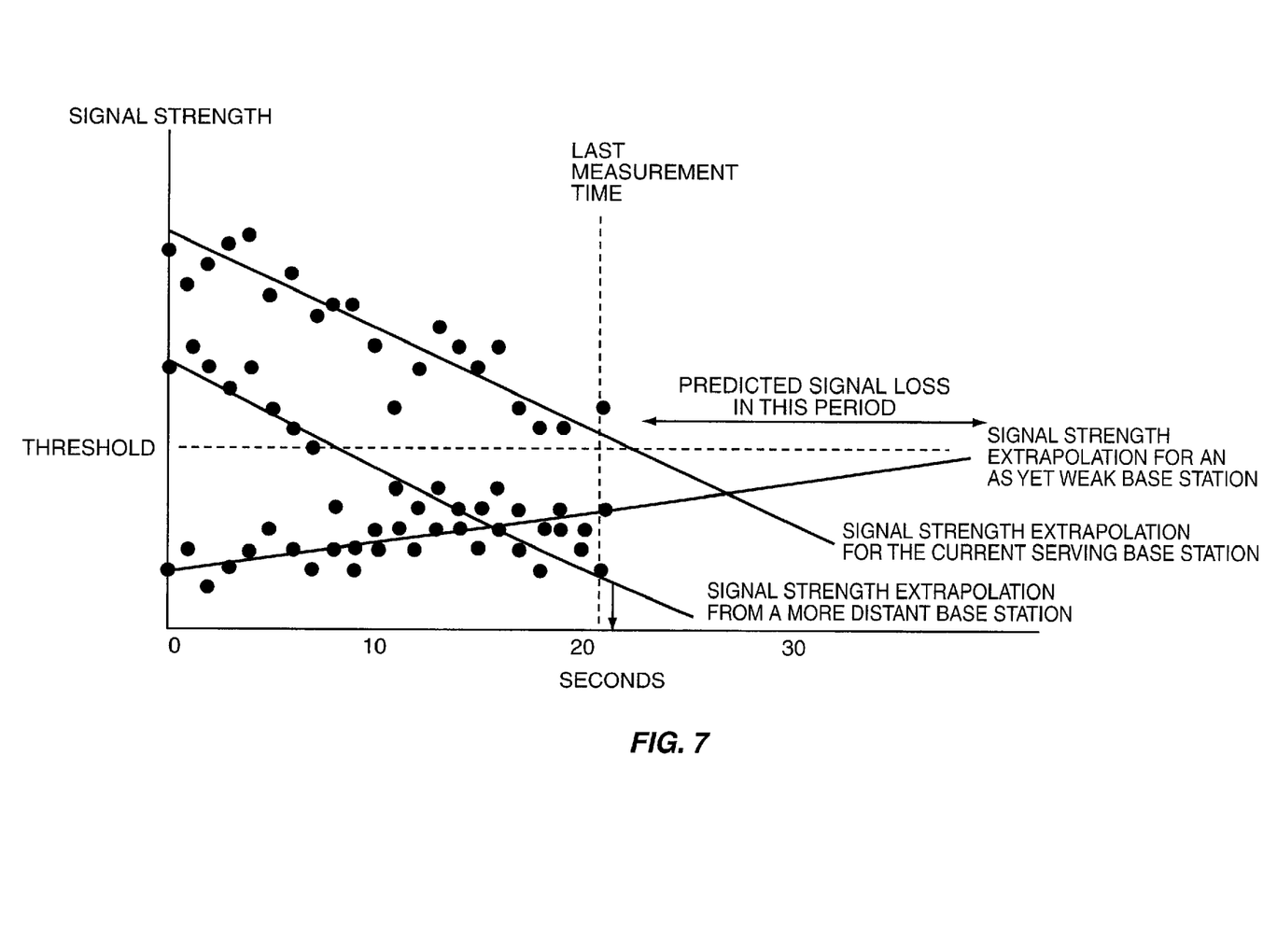
FIG. 7 shows a plot of signal strength measurements generated by one exemplary measurement circuit associated with the prediction processor of FIG. 6.

FIG. 7 shows one exemplary graph derived from measured and extrapolated RBS signal strength data associated with three RBSs 114. As shown in FIG. 7, the strength of the strongest RBS signal is decreasing and will soon drop below a predetermined threshold. While the strength of another RBS signal is increasing, this signal will not exceed the predetermined threshold before the other signals drop below the threshold. When the strength of all RBS signals is expected to fall below the threshold, evaluation circuit 178 determines that the loss of usable RBS signals is imminent. When the evaluation circuit 178 determines that the signal loss is imminent and will last more than a predetermined period of time, the prediction circuit 170 provides the prediction to the message circuit 172. In response, message circuit 172 generates a mobility message and sends the mobility message to the mobility server 130 as described above.

The above describes how a mobility server 130 updates a location register 128 so that a network 100 may page the wireless terminal 160 via satellite 152 while the wireless terminal 160 is out of range from any RBS 114. It will be appreciated that the network 100 may also continue to page the wireless terminal 160 via the terrestrial RBSs 114, even when the network 100 is paging the wireless terminal 160 via the satellite 152. To that end, the network 100 may use different time slots for sending paging signals from the satellite 152 and the RBSs 114, as discussed below. If at some point a signal received at the wireless terminal 160 from an RBS 114 reaches a usable signal strength, the wireless terminal 160 may register with the RBS 114 to update the location register 128 so that the wireless terminal 160 may receive future paging signals from the RBSs 114 in the corresponding paging area. At some point thereafter, the network 100 may decide to terminate paging via the satellite 152 to free up the paging capacity of the limited resource satellite system 150, 152.

When the wireless terminal 160 monitors and/or evaluates signals from both the satellite and one or more RBSs 114, the mobility server 130 may coordinate the timing operations associated with the terrestrial and satellite signals. For example, wireless terminal 160 may identify the current "awake" time slot assigned to the wireless terminal 160 in the mobility message transmitted to the mobility server 130. The mobility server 130 may subsequently notify the wireless terminal 160 of a different "awake" time slot to use for receiving paging signals via the satellite 152. Such a notification may be sent to the wireless terminal 160 as part of an ACK message that acknowledges safe receipt of the mobility message at the mobility server 130. It will be appreciated that the mobility server 130 may notify the wireless terminal 160 of a satellite time slot assigned by the network 100. Alternatively, the mobility server 130 may assign a time slot for the satellite signals and notify both the network 100 and the wireless terminal 160 of the assigned satellite time slot. Using different sleep-mode time-slots in which to listen for terrestrial and satellite paging, respectively, facilitates the wireless terminal's ability to listen for both.

Figure 8:
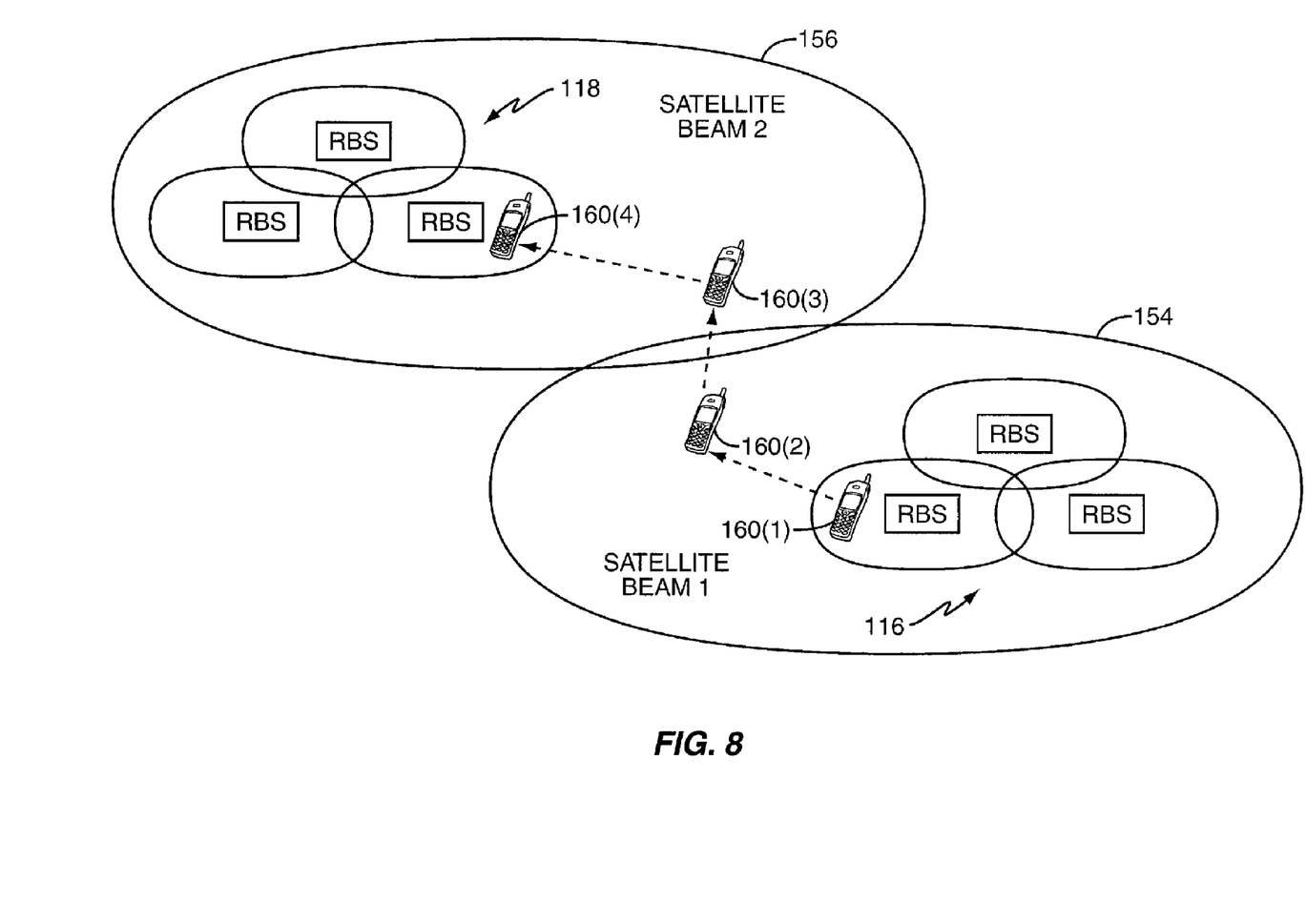
FIG. 8 shows an exemplary communications scenario applicable to the present invention.

While the above describes a mobility server 130 that provides mobility management means for a single mobility management event, it will be appreciated that the mobility server 130 may be used to register multiple mobility management events with the MSC/LR 124. To illustrate, consider the network scenario shown in FIG. 8. While in position (1), the RBSs 114 in a first paging area 116 send paging signals to the wireless terminal 160. As the wireless terminal 160 moves to position (2), it will lose the ability to reliably receive paging signals from the first paging area 116. In this situation, the mobility server 130 receives a mobility message from the wireless terminal 160 indicating this imminent condition. The mobility server 130 then updates the location register 128 as described above so that the wireless terminal 160 will receive future paging signals via a first satellite beam 154 from the satellite 152. As the wireless terminal 160 continues to move to position (3), wireless terminal 160 may move outside the range of the first satellite beam 154 and into the coverage area of a second satellite beam 156. In this situation, the mobility server 130 may update the location register 128 responsive to another mobility message so that the wireless terminal 160 will receive future paging signals via a second satellite beam 156. The wireless terminal may eventually move to position (4), which is within the range of a second terrestrial paging area 118. In this situation, mobility server 130 may update the location register 128 responsive to another mobility message so that wireless terminal 160 will receive future paging signals via the RBSs 114 in the second paging area 118. Alternatively, once the wireless terminal 160 reestablishes useful communications with an RBS 114 in the second paging area 118, the wireless terminal 160 may re-register with the MSC/LR 124 via the new RBS 114 using conventional means. At some point thereafter the network 100 may decide to terminate paging via the satellite 152 to free up the paging capacity of the limited resource satellite 152.

Figure 9:
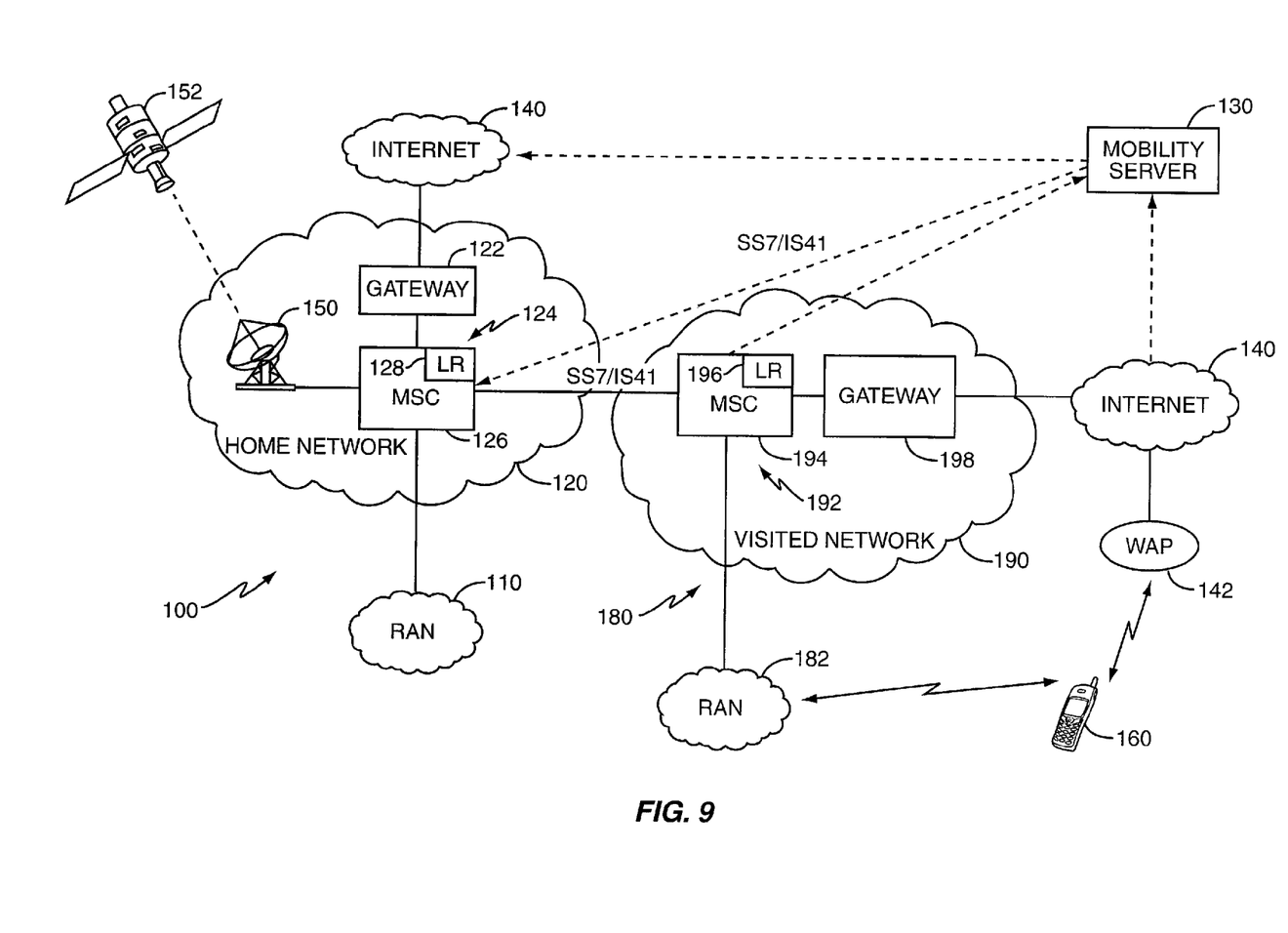
FIG. 9 shows the wireless communication network of FIG. 1 connected to a second wireless communication network.

The above describes how a mobility server 130 may be used to update a location register 128 in a dual-mode network 100 having both terrestrial and satellite capabilities. However, it will be appreciated that the mobility server 130 may also be used to update the location register 128 even when the wireless terminal 160 is receiving service from other networks. FIG. 9 shows another exemplary network 180 connected to the network 100 of FIG. 1. Network 180 comprises a non-enhanced network and includes a RAN 182 and a core network 190. Core network 190 includes an MSC/LR 192, including an MSC 194 and location register 196, a gateway 198, but is not necessarily associated with any satellite system. When the wireless terminal 160 communicates via network 180, the wireless terminal 160 may not know and may be unable to determine the signaling-plane or control-plane abilities of network 180, which may be a visited network. Nevertheless, network 180 will provide traffic channels that allow the terminal 160 to communicate user-plane messages to its mobility server 130. The mobility server 130 then conveys those messages in a suitably translated form to the MSC/LR 124 of network 100. MSC 126 then formulates any required control-plane messages needed to be sent to the MSC 194 of the visited network 180 using a standard control protocol, such as SS7 or IS-41.

The mobility server of the present invention enhances conventional mobility management operations without requiring any modifications to existing networks, such as network 180, and without requiring the wireless terminal 160 to send control-plane registration messages via a limited capacity network, such as a satellite system. Further, because the wireless terminal 160 communicates the mobility messages directly with the mobility server 130 as user-plane messages over a conventional traffic connection, the mobility management enhancements provided by the mobility server 130 may be privately arranged between the wireless terminal 160 and its home network.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless terminal associated with a communication network, said wireless terminal comprising:
    memory for storing a network address of a mobility server configured to supplement mobility management operations of said communication network;
    a prediction processor configured to predict future mobility management events associated with said wireless terminal; and
    a message processor configured to generate mobility messages based on said prediction and to send said mobility messages as user-plane messages to said mobility server at said stored network address over a traffic data channel.

2. The wireless terminal of claim 1 wherein the prediction processor comprises:
    a measurement circuit configured to measure a characteristic of signals received from one or more base stations in said communication network; and
    an evaluation circuit configured to predict the future mobility management events based on the measured characteristic.

3. The wireless terminal of claim 2 wherein the measured characteristic comprises at least one of a signal quality and a signal strength.

4. The wireless terminal of claim 1 wherein the prediction processor comprises:
    a location circuit configured to determine a location of the wireless terminal in said communication network; and
    an evaluation circuit configured to predict the future mobility management events based on the determined location.

5. The wireless terminal of claim 1 wherein said mobility messages indicate imminent loss of useable base station signals at said wireless terminal.

6. The wireless terminal of claim 1 wherein said mobility messages indicate imminent return of useable base station signals at said wireless terminal.

7. The wireless terminal of claim 1 wherein the predetermined network address comprises at least one of a phone number, a Wireless Fidelity (WiFi) address, and an Internet Protocol (IP) address.

8. The wireless terminal of claim 1 wherein each mobility message comprises one of a packet-data message, a Dual-Tone Multi-Frequency (DTMF) sequence, and an Short Message Service (SMS) message.

9. The wireless terminal of claim 1 wherein the traffic data channel comprises a cellular or satellite network traffic data channel.

10. A method of supplementing mobility management operations in a communication network comprising:
    storing a network address of a mobility server configured to supplement mobility management operations of said communication network in a memory of a wireless terminal;
    predicting future mobility management events associated with said wireless terminal;
    generating mobility messages based on said prediction; and
    sending said mobility messages to said mobility server at said stored network address as user-plane messages over a traffic data channel.

11. The method of claim 10 wherein predicting the future mobility management events comprises:
    measuring a characteristic of signals received from one or more base stations in said communication network; and
    predicting the future mobility management events based on the measured characteristic.

12. The method of claim 11 wherein measuring the characteristic comprises measuring at least one of a quality and a strength of signals received from one or more base stations in said communication network.

13. The method of claim 10 wherein predicting the future mobility management events comprises:
    determining a location of the wireless terminal in said communication network; and
    predicting the future mobility management events based on the determined location.

14. The method of claim 10 wherein sending said mobility messages comprises sending said mobility messages to said mobility server at said stored network address as user-plane messages over a cellular or satellite network traffic data channel.

* * * * *